United States Patent
Wakasugi

(10) Patent No.: US 11,043,670 B2
(45) Date of Patent: Jun. 22, 2021

(54) ALL-SOLID-STATE BATTERY INCLUDING AN ANODE HAVING AN ANODE LAYER CONTAINING $MSI_2$

(71) Applicant: TOYOTA JIDOSHA KABUSHIKI KAISHA, Toyota (JP)

(72) Inventor: Satoshi Wakasugi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/674,465

(22) Filed: Nov. 5, 2019

(65) Prior Publication Data
US 2020/0152982 A1    May 14, 2020

(30) Foreign Application Priority Data

Nov. 12, 2018   (JP) .............................. JP2018-212190

(51) Int. Cl.
*H01M 4/58* (2010.01)
*H01M 10/0585* (2010.01)
*H01M 4/02* (2006.01)

(52) U.S. Cl.
CPC ......... *H01M 4/58* (2013.01); *H01M 10/0585* (2013.01); *H01M 2004/027* (2013.01)

(58) Field of Classification Search
CPC ............................... H01M 4/58; H01M 4/386
See application file for complete search history.

(56) References Cited

U.S. PATENT DOCUMENTS

| | | | |
|---|---|---|---|
| 6,235,427 B1 * | 5/2001 | Idota | H01M 4/134 29/623.1 |
| 2013/0295451 A1 * | 11/2013 | Miki | H01M 10/0562 429/209 |
| 2017/0005329 A1 * | 1/2017 | Kim | H01M 4/366 |
| 2017/0338480 A1 * | 11/2017 | Kim | H01M 4/1393 |

FOREIGN PATENT DOCUMENTS

| | | |
|---|---|---|
| JP | 2000-012088 A | 1/2000 |
| JP | 4085473 B2 | 5/2008 |
| JP | 2011-34836 A | 2/2011 |
| JP | 2017-059534 A | 3/2017 |

* cited by examiner

*Primary Examiner* — Robert S Carrico
(74) *Attorney, Agent, or Firm* — Sughrue Mion, PLLC

(57) ABSTRACT

Disclosed is an anode for all-solid-state batteries, which is, when used in an all-solid-state battery, configured to suppress an increase in the confining pressure of the battery during charge. The anode may be an anode wherein the anode is for use in all-solid-state batteries and comprises an anode layer, and wherein the anode layer contains $MSi_2$ (where M is one element selected from the group consisting of Yb, Er, Tm and Lu) as an anode active material.

1 Claim, 2 Drawing Sheets

ALL-SOLID-STATE BATTERY INCLUDING AN ANODE HAVING AN ANODE LAYER CONTAINING MSI$_2$

TECHNICAL FIELD

The disclosure relates to an anode.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

An active material (an alloy-based active material) containing a metal that can be alloyed with Li, such as Si, has large theoretical capacity per volume, compared to a carbon-based anode active material. Accordingly, an all-solid-state battery in which such an alloy-based active material is used in the anode, has been proposed.

For the purpose of increasing the cycle characteristics of all-solid-state batteries, Patent Literature 1 discloses an all-solid-state battery system comprising an anode active material layer that contains an alloy-based anode active material particles, and a method for producing the all-solid-state battery system.

Patent Literature 2 describes that YbSi$_2$ can be used as a material for the anode of non-aqueous secondary batteries.

Patent Literature 3 discloses a material for the anode of lithium ion secondary batteries, which is configured to achieve high capacity and excellent cycle characteristics.

Patent Literature 1: Japanese Patent Application Laid-Open (JP-A) No. 2017-059534

Patent Literature 2: JP4085473(B2)

Patent Literature 3: JP-A No. 2011-034836

An all-solid-state battery in which a Si-based substance is used as an anode active material, has a problem in that the anode active material expands during charging of the all-solid-state battery and results in an increase in the confining pressure of the all-solid-state battery.

The disclosed embodiments were achieved in light of the above circumstances. An object of the disclosed embodiments is to provide an anode for all-solid-state batteries, which is, when used in an all-solid-state battery, configured to suppress an increase in the confining pressure of the battery during charge.

In a first embodiment, there is provided an anode wherein the anode is for use in all-solid-state batteries and comprises an anode layer, and wherein the anode layer contains MSi$_2$ (where M is one element selected from the group consisting of Yb, Er, Tm and Lu) as an anode active material.

In a second embodiment, there is provided an all-solid-state battery comprising a cathode, the anode and a solid electrolyte layer disposed between the cathode and the anode.

According to the disclosed embodiments, the anode for all-solid-state batteries can be provided, which is, when used in an all-solid-state battery, configured to suppress an increase in the confining pressure of the battery during charge.

BRIEF DESCRIPTION OF THE DRAWINGS

In the accompanying drawings.

DETAILED DESCRIPTION

Figure 1:
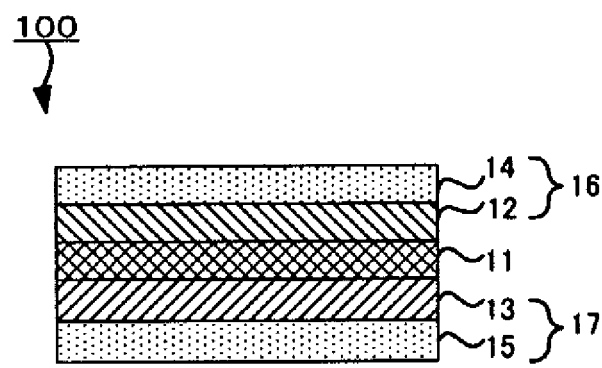
FIG. 1 is a schematic sectional view of an example of the all-solid-state battery of the disclosed embodiments.

The anode of the disclosed embodiments is an anode wherein the anode is for use in all-solid-state batteries and comprises an anode layer, and wherein the anode layer contains MSi$_2$ (where M is one element selected from the group consisting of Yb, Er, Tm and Lu) as an anode active material.

If Li ions are intercalated into the crystal of elemental Si particles having a diamond structure, the Li ions are taken in the crystal structure of the elemental Si particles. At this time, the crystal lattice size of the elemental Si particles increases and results in an expansion of the elemental Si particles.

Accordingly, when elemental Si crystal having a diamond structure as its crystal structure, is used as the anode active material of an all-solid-state battery, there is a problem in that cracking occurs inside the anode after repeating charge and discharge of the battery, or very high stress is applied to the confining member of the battery during charge and, as a result, a highly rigid confining structure is required.

It was found that an increase in the confining pressure of an all-solid-state battery during charge, can be suppressed by using, as the anode active material of the all-solid-state battery, a substance which is represented by MSi$_2$ (where M is one element selected from the group consisting of Yb, Er, Tm and Lu) and which has an AlB$_2$-type crystal structure.

In the substance which is represented by MSi$_2$ (where M is one element selected from the group consisting of Yb, Er, Tm and Lu) and which has the AlB$_2$-type crystal structure, a layered structure is formed by the Si element, and the M element is disposed between the Si element layers in the structure. Then, Li is absorbed between the Si element layers. As a result, it is inferred that an expansion of the anode active material of the all-solid-state battery during charge, can be suppressed.

[Anode]

The anode comprises an anode layer. As needed, the anode comprises an anode current collector.

The anode layer contains MSi$_2$ (where M is one element selected from the group consisting of Yb, Er, Tm and Lu) as an anode active material. As optional components, the anode layer may contain a solid electrolyte, an electroconductive material, a binder, etc.

As needed, in addition to the MSi$_2$, a material that is used as a conventionally-known anode active material, may be used as the anode active material.

As the substance that is represented by the above-mentioned MSi$_2$ and is used as the anode active material, examples include, but are not limited to, ytterbium silicide (YbSi$_2$), erbium silicide (ErSi$_2$), thulium silicide (TmSi$_2$) and lutetium silicide (LuSi$_2$). Of them, the substance may be ytterbium silicide (YbSi$_2$).

The substance represented by the MSi$_2$ may have the AlB$_2$-type crystal structure.

The ytterbium silicide (YbSi$_2$) used in the disclosed embodiments has peaks at positions of 2θ=21.6°, 26.8°, 34.7°, 44.0°, 47.4°, 52.4°, 60.2° and 66.8° in an XRD spectrum obtained by X-ray diffraction (XRD) measurement using CuKa radiation. The position of each peak may have a minor deviation. The deviation is allowable as long as it is in a range of the 2θ value±0.5°. In the disclosed embodiments, "±0.5°" following the 2θ value means the allowable deviation range of the 2θ value.

The conditions of the XRD measurement of the anode active material are as follows.

X-ray diffraction measurement device: RINT-2500 (manufactured by Rigaku Corporation)
X-ray source: CuKα
Measurement range: 2θ=10° to 80°
Measurement interval: 0.02°
Scan rate: 10°/min
Measurement voltage: 50 kV
Measurement current: 300 mA For the ytterbium silicide (YbSi$_2$) used in the disclosed embodiments, the presence of Yb and Si elements can be confirmed by energy dispersive x-ray (EDX) elemental analysis.

The content of the MSi$_2$ in the anode layer, is not particularly limited. From the viewpoint of suppressing an increase in the confining pressure of the all-solid-state battery, the MSi$_2$ may be 50 mass % or more and 90 mass % or less of the total mass of the anode layer.

The form of the anode active material is not particularly limited. As the form, examples include, but are not limited to, a particulate form and a thin film form. From the viewpoint of dispersibility of the anode active material in the anode layer, the anode active material may be in a particulate form.

When the anode active material is in a particulate form, the average particle diameter (D$_{50}$) of the anode active material particles may be 1 nm or more and 100 μm or less, or it may be 10 nm or more and 30 μm or less, for example.

As the electroconductive material, binder and solid electrolyte contained in the anode layer, examples include, but are not limited to, those exemplified below as the electroconductive material, binder and solid electrolyte contained in a cathode layer.

The method for forming the anode layer is not particularly limited. As the method, examples include, but are not limited to, pressure-forming a powdered anode mix that contains the anode active material and, as needed, other components such as an electroconductive material and a binder. Another example of the method for producing the anode layer is as follows: an anode slurry containing the anode active material, a solvent and, as needed, other components such as an electroconductive material and a binder, is prepared; the anode slurry is applied on one surface of the anode current collector or solid electrolyte layer; and the applied anode slurry is dried, thereby forming the anode layer. As the solvent used in the anode slurry, examples include, but are not limited to, those exemplified below as the solvent used in the below-described cathode slurry. As the method for applying the anode slurry to one surface of the anode current collector or solid electrolyte layer, examples include, but are not limited to, those exemplified below as the method for applying the cathode slurry.

As the anode current collector, a conventionally-known metal that is usable as a current collector in all-solid-state batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the anode current collector is not particularly limited. As the form, examples include, but are not limited to, various kinds of forms such as a foil form and a mesh form.

The form of the whole anode is not particularly limited. It may be a sheet form. In this case, the thickness of the whole anode is not particularly limited. It can be determined depending on desired performance.

[All-Solid-State Battery]

The anode of the disclosed embodiments is for use in all-solid-state batteries.

The all-solid-state battery of the disclosed embodiments comprises a cathode, the anode and a solid electrolyte layer disposed between the cathode and the anode.

FIG. 1 is a schematic sectional view of an example of the all-solid-state battery of the disclosed embodiments. In the accompanying drawings, for ease of illustration and understanding, the components shown in the figures are appropriately scaled down, or the horizontal to vertical dimensional ratio of the components is changed from the actual ratio and exaggerated.

As shown in FIG. 1, an all-solid-state battery 100 comprises a cathode 16 comprising a cathode layer 12 and a cathode current collector 14, an anode 17 comprising an anode layer 13 and an anode current collector 15, and a solid electrolyte layer 11 disposed between the cathode 16 and the anode 17.

[Cathode]

The cathode comprises at least the cathode layer. As needed, it comprises the cathode current collector.

The cathode layer contains a cathode active material. As optional components, the cathode layer may contain a solid electrolyte, an electroconductive material, a binder, etc.

The type of the cathode active material is not particularly limited. As the cathode active material, examples include, but are not limited to, LiCoO$_2$, LiNi$_x$Co$_{1-x}$O$_2$ (0<x<1), LiNi$_{1/3}$Co$_{1/3}$Mn$_{1/3}$O$_2$, LiMnO$_2$, different element-substituted Li—Mn spinels (such as LiMn$_{1.5}$Ni$_{0.5}$O$_4$, LiMn$_{1.5}$Al$_{0.5}$O$_4$, LiMn$_{1.5}$Mg$_{0.5}$O$_4$, LiMn$_{1.5}$Co$_{0.5}$O$_4$, LiMn$_{1.5}$Fe$_{0.5}$O$_4$ and LiMn$_{1.5}$Zn$_{0.5}$O$_4$), lithium titanates (such as Li$_4$Ti$_5$O$_{12}$), lithium metal phosphates (such as LiFePO$_4$, LiMnPO$_4$, LiCoPO$_4$ and LiNiPO$_4$), transition metal oxides (such as V$_2$O$_5$ and MoO$_3$), TiS$_2$, LiCoN, Si, SiO$_2$, Li$_2$SiO$_3$, Li$_4$SiO$_4$, and lithium storage intermetallic compounds (such as Mg$_2$Sn, Mg$_2$Ge, Mg$_2$Sb and Cu$_3$Sb).

The form of the cathode active material is not particularly limited. It may be a particulate form.

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, LiNbO$_3$, Li$_4$Ti$_5$O$_{12}$ and Li$_3$PO$_4$. For the thickness of the coating layer, the lower limit may be 0.1 nm or more, or it may be 1 nm or more, for example. On the other hand, the upper limit may be 100 nm or less, or it may be 20 nm or less, for example.

The content of the cathode active material in the cathode layer is not particularly limited. For example, it may be in a range of from 10 mass % to 100 mass %.

As the solid electrolyte used in the cathode layer, examples include, but are not limited to, those exemplified below as the solid electrolyte used in the below-described solid electrolyte layer.

The content ratio of the solid electrolyte in the cathode layer is not particularly limited.

As the electroconductive material, a known electroconductive material may be used. As the electroconductive material, examples include, but are not limited to, a carbonaceous material and metal particles. The carbonaceous material may be at least one selected from the group consisting of carbon nanotube, carbon nanofiber and carbon blacks such as acetylene black (AB) and furnace black. Of them, from the viewpoint of electron conductivity, the electroconductive material may be at least one selected from the group consisting of carbon nanotube and carbon nanofiber. The carbon nanotube and carbon nanofiber may be vapor-grown carbon fiber (VGCF). As the metal particles, examples include, but are not limited to, particles of Ni, particles of Cu, particles of Fe and particles of SUS. The content of the electroconductive material in the cathode layer is not particularly limited.

As the binder, examples include, but are not limited to, rubber-based binders such as butadiene rubber, hydrogenated butadiene rubber, styrene-butadiene rubber (SBR), hydrogenated styrene-butadiene rubber, nitrile-butadiene rubber, hydrogenated nitrile-butadiene rubber and ethylene-propylene rubber; fluoride-based binders such as polyvinylidene fluoride (PVdF), polyvinylidene fluoride-polyhexafluoropropylene copolymer (PVDF-HFP), polytetrafluoroethylene and fluorine rubber; polyolefin-based thermoplastic resins such as polyethylene, polypropylene and polystyrene; imide-based resins such as polyimide and polyamideimide; amide-based resins such as polyamide; acrylic resins such as polymethyl acrylate and polyethyl acrylate; and methacrylic resins such as polymethyl methacrylate and polyethyl methacrylate. The content of the binder in the cathode layer is not particularly limited.

The thickness of the cathode layer is not particularly limited.

The cathode layer can be formed by a conventionally-known method.

For example, a cathode slurry is produced by putting the cathode active material and the binder in a solvent and mixing them. The cathode slurry is applied on one surface of a substrate such as the cathode current collector. The applied cathode slurry is dried, thereby forming the cathode layer.

As the solvent, examples include, but are not limited to, butyl acetate, butyl butyrate, heptane and N-methyl-2-pyrrolidone.

The method for applying the cathode slurry on one surface of the substrate such as the cathode current collector, is not particularly limited. As the method, examples include, but are not limited to, a doctor blade method, a metal mask printing method, an electrostatic coating method, a dip coating method, a spray coating method, a roller coating method, a gravure coating method and a screen printing method.

The cathode layer may be formed by another method such as pressure-forming a powdered cathode mix that contains the cathode active material and, as needed, other components.

As the cathode current collector, a conventionally-known metal that is usable as a current collector in all-solid-state batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The form of the whole cathode is not particularly limited. It may be a sheet form. In this case, the thickness of the whole cathode is not particularly limited. It can be determined depending on desired performance.

[Solid Electrolyte Layer]

The solid electrolyte layer contains at least a solid electrolyte.

As the solid electrolyte, examples include, but are not limited to, a sulfide-based solid electrolyte and an oxide-based solid electrolyte.

As the sulfide-based solid electrolyte, examples include, but are not limited to, $Li_2S$—$P_2S_5$, $Li_2S$—$SiS_2$, $LiX$—$Li_2S$—$SiS_2$, $LiX$—$Li_2S$—$P_2S_5$, $LiX$—$Li_2O$—$Li_2S$—$P_2S_5$, $LiX$—$Li_2S$—$P_2O_5$, $LiX$—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds. When two or more kinds of LiX are contained in the raw material composition, the mixing ratio is not particularly limited.

The molar ratio of the elements in the sulfide-based solid electrolyte can be controlled by controlling the contents of the elements contained in raw materials. The molar ratio and composition of the elements in the sulfide-based solid electrolyte can be measured by inductively coupled plasma atomic emission spectroscopy, for example.

The sulfide-based solid electrolyte may be a glass, a crystal material or a crystalline glass ceramic.

The crystal state of the sulfide-based solid electrolyte can be confirmed by X-ray powder diffraction measurement using CuKα radiation, for example.

In the disclosed embodiments, "glass" means a material having a crystallinity of less than 20%; "glass ceramic" means a material having a crystallinity of 20% or more and less than 80%; and "crystal" means a material having a crystallinity of 80% or more.

The crystallinity can be a value obtained as follows. NMR measurement is carried out on the sulfide-based solid electrolyte. From an NMR spectrum thus obtained, the area of the peak assigned to the crystal and the area of all peaks are measured. According to the following formula, the area of the peak assigned to the crystal is divided by the area of the all peaks, and the resulting value is multiplied by 100. Finally, the crystallinity is obtained.

Crystallinity (%)=(The area of a peak assigned to the crystal)/(The area of all peaks)×100

The glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired glass can be efficiently obtained.

The conditions of the mechanical milling are determined to ensure that the desired glass is obtained. For example, in the case of using the planetary ball mill, the raw material composition and grinding balls are put in a container, and mechanical milling is carried out at a predetermined rotational frequency for a predetermined time. In general, the larger the rotational frequency, the faster the glass production speed, and the longer the mechanical milling time, the higher the conversion rate of the raw material composition into the glass.

In the case of using the planetary ball mill, the plate rotational frequency is in a range of from 200 rpm to 500 rpm, for example. The plate rotational frequency may be in a range of from 250 rpm to 400 rpm.

In the case of using the planetary ball mill, the mechanical milling time is in a range of from 1 to 100 hours, for example. The mechanical milling time may be in a range of from 1 to 50 hours.

As the material for the container and grinding balls used in the ball mill, examples include, but are not limited to, $ZrO_2$ and $Al_2O_3$.

The diameter of the grinding balls is in a range of from 1 mm to 20 mm, for example.

A liquid is used for wet mechanical milling. The liquid may be a liquid that does not produce hydrogen sulfide in a reaction with the raw material composition. Hydrogen sulfide can be produced when protons are dissociated from the molecules of the liquid and reacted with the raw material composition or glass. Accordingly, the liquid may have aprotic properties to a degree that does not result in the production of hydrogen sulfide. Aprotic liquids can be broadly classified into polar and non-polar aprotic liquids.

The polar aprotic liquid is not particularly limited. As the polar aprotic liquid, examples include, but are not limited to, ketones such as acetone; nitriles such as acetonitrile; amides such as N,N-dimethylformamide (DMF); and sulfoxides such as dimethylsulfoxide (DMSO).

As the non-polar aprotic liquid, examples include, but are not limited to, aliphatic hydrocarbons such as heptane; aromatic hydrocarbons such as benzene, toluene and xylene; chain ethers such as diethyl ether and dimethyl ether; cyclic ethers such as tetrahydrofuran; alkyl halides such as chloroform, methyl chloride and methylene chloride; esters such as ethyl acetate; and fluorine compounds such as benzene fluoride, heptane fluoride, 2,3-dihydroperfluoropentane, and 1,1,2,2,3,3,4-heptafluorocyclopentane. The amount of the added liquid is not particularly limited, and it may be an amount to a degree that can obtain the desired sulfide-based solid electrolyte.

The glass ceramic can be obtained by heating a glass, for example.

The crystal material can be obtained by heating a glass or developing a solid state reaction of the raw material composition, for example.

For the heating, the heating temperature may be a temperature higher than the crystallization temperature (Tc) of the glass, which is a temperature observed by thermal analysis measurement. In general, it is 195° C. or more. On the other hand, the upper limit of the heating temperature is not particularly limited.

The crystallization temperature (Tc) of the glass can be measured by differential thermal analysis (DTA).

The heating time is not particularly limited, as long as the desired crystallinity is obtained. For example, it is in a range of from one minute to 24 hours, or it may be in a range of from one minute to 10 hours.

The heating method is not particularly limited. For example, a firing furnace may be used.

As the oxide-based solid electrolyte, examples include, but are not limited to, $Li_{6.25}La_3Zr_2Al_{0.25}O_{12}$, $Li_3PO_4$, and $Li_3+PO_{4-x}N_x$ (LiPON).

From the viewpoint of handling, the form of the solid electrolyte may be a particulate form.

The average particle diameter ($D_{50}$) of the solid electrolyte particles is not particularly limited. The lower limit may be 0.5 μm or more, and the upper limit may be 2 μm or less.

As the solid electrolyte, one or more kinds of solid electrolytes may be used. In the case of using two or more kinds of solid electrolytes, they may be mixed together.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when the particle diameters of particles are arranged in ascending order, the accumulated volume of the particles is half (50%) the total volume of the particles (volume average diameter).

The content ratio of the solid electrolyte in the solid electrolyte layer is not particularly limited.

From the viewpoint of exerting plasticity, etc., a binder for binding the solid electrolyte particles can be incorporated in the solid electrolyte layer. As the binder, examples include, but are not limited to, a binder that can be incorporated in the above-described cathode. However, the content of the binder in the solid electrolyte layer may be 5.0 mass % or less, from the viewpoint of preventing excessive aggregation of the solid electrolyte, enabling the formation of the solid electrolyte layer in which the solid electrolyte is uniformly dispersed, etc., for the purpose of easily achieving high battery power output.

The thickness of the solid electrolyte layer is not particularly limited and is appropriately controlled depending on the battery structure. It is generally 0.1 μm or more and 1 mm or less.

The solid electrolyte layer may be formed by pressure-forming a powdered material for forming the solid electrolyte layer, the material containing the solid electrolyte and, as needed, other components.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the all-solid-state battery, examples include, but are not limited to, an all-solid-state lithium battery in which a lithium metal deposition-dissolution reaction is used as an anode reaction, an all-solid-state lithium ion battery in which intercalation of lithium in the anode active material is used as an anode reaction, an all-solid-state sodium battery, an all-solid-state magnesium battery and an all-solid-state calcium battery. The all-solid-state battery may be the all-solid-state lithium ion battery. Also, the all-solid-state battery may be a primary or secondary battery.

As the form of the all-solid-state battery, examples include, but are not limited to, a coin form, a laminate form, a cylindrical form and a square form.

The method for producing the all-solid-state battery of the disclosed embodiments, is as follows, for example. First, the solid electrolyte layer is formed by pressure-forming a powdered solid electrolyte material. Next, the cathode layer is obtained by pressure-forming the powdered cathode mix on one surface of the solid electrolyte layer. Then, the anode layer is obtained by pressure-forming the powdered anode mix on the other surface of the solid electrolyte layer. As needed, a current collector is attached to a cathode layer-solid electrolyte layer-anode layer assembly thus obtained. Finally, the assembly may be used as the all-solid-state battery.

In this case, the press pressure applied for pressure-forming the powdered solid electrolyte material, the powdered cathode mix and the powdered anode mix, is generally about 1 MPa or more and about 600 MPa or less.

The pressure applying method is not particularly limited. As the method, examples include, but are not limited to, pressing by use of a plate press machine, a roll press machine or the like.

Another example of the method for forming the all-solid-state battery of the disclosed embodiments, is as follows. First, the solid electrolyte layer is formed by pressure-forming the powdered solid electrolyte material. The cathode slurry is applied on one surface of the cathode current collector. The applied cathode slurry is dried, thereby obtaining the cathode comprising the cathode layer. Then, the anode slurry is applied on one surface of the anode current collector. The applied anode slurry is dried, thereby obtaining the anode comprising the anode layer. The solid electrolyte layer is disposed between the cathode layer and the anode layer to ensure that the cathode current collector, the cathode layer, the solid electrolyte layer, the anode layer and the anode current collector are arranged in this order, thereby obtaining the all-solid-state battery.

The production of the all-solid-state battery may be carried out in the state that moisture is removed from the system as much as possible. For example, it is thought to be effective to depressurize the inside of the system in the production steps and to replace the inside of the system by a substantially moisture-free gas (such as inert gas) in the production steps.

EXAMPLES

Example 1

[Synthesis of Solid Electrolyte]

A mixture was obtained by mixing the following raw materials for a solid electrolyte, in an agate mortar for 5 minutes: 0.550 g of $Li_2S$ (manufactured by Furuuchi Chemical Corporation), 0.887 g of $P_2S_5$ (manufactured by Aldrich), 0.285 g of LiI (manufactured by Nippoh Chemicals Co., Ltd.) and 0.277 g of LiBr (manufactured by Kojundo Chemical Laboratory Co., Ltd.) The mixture was transferred to a container. Then, 4 g of n-heptane (dehydrated grade, manufactured by Kanto Chemical Co., Inc.) was put in the container. The mixture was subjected to mechanical milling for 40 hours by use of a planetary ball mill, thereby obtaining a solid electrolyte (LiI—LiBr—$Li_2S$—$P_2S_5$).

[Production of Cathode Mix]

As a cathode active material, $LiNi_{1/3}Co_{1/3}Mn_{1/3}O_2$ (manufactured by Nichia Corporation) was used, which was surface-coated with $LiNbO_3$.

A cathode mix (cathode slurry) was obtained by mixing the following raw materials for a cathode layer, by use of an ultrasonic homogenizer ("UH-50" manufactured by SMT Co., Ltd.): 1.5 g of the cathode active material, 0.023 g of vapor-grown carbon fiber (or VGCF, manufactured by Showa Denko K. K.), which was used as an electroconductive material, 0.239 g of the solid electrolyte, 0.011 g of PVdF (manufactured by Kureha Corporation), which was used as a binder, and 0.8 g of butyl butyrate (manufactured by Kishida Chemical Co., Ltd.), which was used as a solvent.

[Production of Anode Mix]

An anode mix (anode slurry) was obtained by mixing the following raw materials for an anode layer, by use of the ultrasonic homogenizer ("UH-50" manufactured by SMT Co., Ltd.): 1.0 g of $YbSi_2$ (manufactured by Leap Labchem Co., Ltd.), which was used as an anode active material, 0.03 g of VGCF (manufactured by Showa Denko K. K.), which was used as an electroconductive material, 0.280 g of the solid electrolyte, 0.010 g of PVdF (manufactured by Kureha Corporation), which was used as a binder, and 1.1 g of butyl butyrate (manufactured by Kishida Chemical Co., Ltd.), which was used as a solvent.

The ratio of Yb atoms to Si atoms in the $YbSi_2$ was measured by EDX analysis (analysis device: X-MAX80, manufactured by: HORIBA, Ltd.) As a result, the ratio was as follows: Yb:Si=33.2:66.8 (in terms of atomic %).

Figure 2:
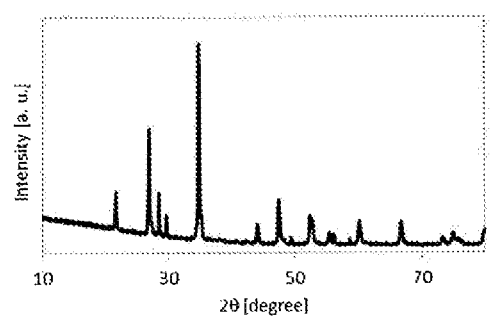
FIG. 2 is an XRD spectrum of YbSi$_2$.

X-ray diffraction (XRD) measurement using CuKa radiation, was carried out on the $YbSi_2$ by use of RINT-2500 (manufactured by Rigaku Corporation) as an X-ray diffraction measurement device. An XRD spectrum thus obtained is shown in FIG. 2.

[Production of Solid Electrolyte Layer]

First, 0.065 g of the solid electrolyte was put in a 1 $cm^2$ ceramic mold and pressed at 1 ton/$cm^2$ (≈98 MPa), thereby obtaining a solid electrolyte layer.

[Production of Battery]

First, 0.020 g of the cathode mix was disposed on one surface of the solid electrolyte layer and pressed at 1 ton/$cm^2$ (≈98 MPa), thereby producing a cathode layer.

Then, 0.030 g of the anode mix was disposed on the other surface of the solid electrolyte layer and pressed at 4 ton/$cm^2$ (≈392 MPa), thereby producing an anode layer.

As a cathode current collector, an aluminum foil was attached to the cathode layer. As an anode current collector, a copper foil was attached to the anode layer. Finally, an all-solid-state battery was obtained.

[Charge-Discharge Test]

The all-solid-state battery was charged at 0.245 mA to 4.35 V with constant current and constant voltage (CC—CV charge). Next, the all-solid-state battery was discharged at 0.245 mA to 3.0 V with constant current and constant voltage (CC—CV discharge).

Then, the all-solid-state battery was charged again. This charge was determined as initial charge. During the initial charge, the confining pressure of the all-solid-state battery was monitored to measure the confining pressure of the all-solid-state battery at 4.55 V. The measured confining pressure was compared to the confining pressure of the all-solid-state battery of Comparative Example 1, which will be described below. The result is shown in Table 1.

In Table 1, "Increased confining pressure amount" means the relative value of the measured confining pressure of the all-solid-state battery after the initial charge, when the confining pressure of the all-solid-state battery of Comparative Example 1 is determined as 100.

Figure 3:
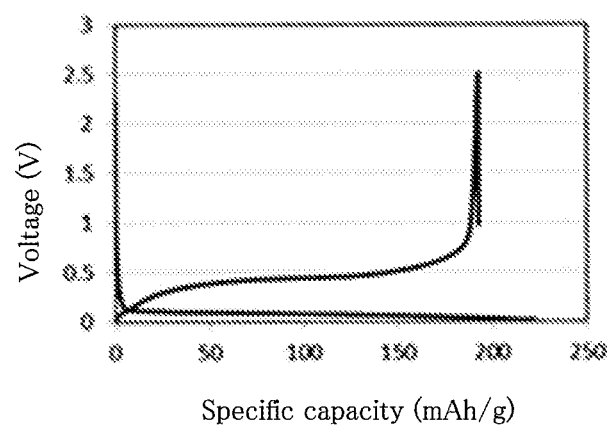
FIG. 3 shows a charge-discharge curve for the all-solid-state battery of Example 1.

FIG. 3 is a view showing a charge-discharge curve for the initially charged/discharged all-solid-state battery of Example 1. The discharge of the all-solid-state battery after the initial charge, was determined as initial discharge.

Comparative Example 1

The all-solid-state battery of Comparative Example 1 was produced in the same manner as Example 1, except that the [Production of anode mix] and the [Production of battery] were carried out as described below. Then, in the same manner as Example 1, the charge-discharge test was carried out on the all-solid-state battery of Comparative Example 1. The result is shown in Table 1.

[Production of Anode Mix]

An anode mix was obtained by mixing the following raw materials for an anode layer, by use of the ultrasonic homogenizer ("UH-50" manufactured by SMT Co., Ltd.): 1.0 g of elemental Si (manufactured by Kojundo Chemical Laboratory Co., Ltd.), which was used as an anode active material, 0.04 g of VGCF (manufactured by Showa Denko K. K.), which was used as an electroconductive material, 0.776 g of the solid electrolyte, 0.02 g of PVdF (manufactured by Kureha Corporation), which was used as a binder, and 1.7 g of butyl butyrate (manufactured by Kishida Chemical Co., Ltd.), which was used as a solvent.

[Production of Battery]

First, 0.020 g of the cathode mix was disposed on one surface of the solid electrolyte layer and pressed at 1 ton/cm$^2$ ($\approx$98 MPa), thereby producing a cathode layer.

Then, 0.0045 g of the anode mix was disposed on the other surface of the solid electrolyte layer and pressed at 4 ton/cm$^2$ ($\approx$392 MPa), thereby producing an anode layer.

As a cathode current collector, an aluminum foil was attached to the cathode layer. As an anode current collector, a copper foil was attached to the anode layer. Finally, the all-solid-state battery of Comparative Example 1 was obtained.

TABLE 1

| | Anode active material | Increased confining pressure amount |
|---|---|---|
| Example 1 | YbSi$_2$ | 87 |
| Comparative Example 1 | Si | 100 |

As shown in Table 1, it is clear that the confining pressure of Example 1 is relatively smaller than the confining pressure of Comparative Example 1. Accordingly, the following was proved: the confining pressure of the all-solid-state battery can be reduced by using YbSi$_2$ as the anode active material, compared to the case of using elemental Si as the anode active material.

Accordingly, it is inferred that the confining pressure of the all-solid-state battery can be reduced by using, as the anode active material, the substance which is represented by MSi$_2$ (where M is one element selected from the group consisting of Yb, Er, Tm and Lu) and which has the same AlB$_2$-type crystal structure as YbSi$_2$.

Comparative Example 2

The liquid battery of Comparative Example 2 was produced in the same manner as Example 1, except that the following [Preparation of liquid electrolyte] was carried out in place of the [Production of solid electrolyte layer], and the [Production of battery] was carried out as described below.

[Preparation of Liquid Electrolyte]

A liquid electrolyte was prepared by using LiPF$_6$ as an electrolyte salt and ethylene carbonate (EC) and diethyl carbonate (DEC) as a solvent.

[Production of Battery]

As a separator, HIPORE (product name, manufactured by Asahi Kasei Corporation) was used. On one surface of the separator, 0.020 g of the cathode mix was disposed and pressed at 1 ton/cm$^2$ ($\approx$98 MPa), thereby producing a cathode layer.

Then, 0.030 g of the anode mix was disposed on the other surface of the separator and pressed at 4 ton/cm$^2$ ($\approx$392 MPa), thereby producing an anode layer.

Then, the separator was impregnated with the liquid electrolyte.

As a cathode current collector, an aluminum foil was attached to the cathode layer. As an anode current collector, a copper foil was attached to the anode layer. Finally, the liquid battery of Comparative Example 2 was obtained. In the same manner as Example 1, the [Charge-discharge test] was carried out on the liquid battery.

Figure 4:
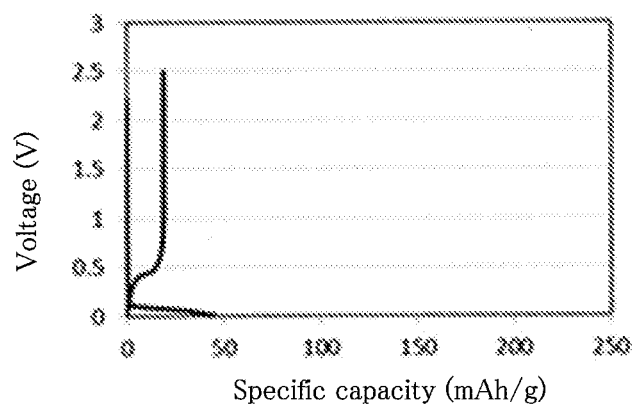
FIG. 4 shows a charge-discharge curve for the liquid battery of Comparative Example 2.

FIG. 4 shows a charge-discharge curve for the initially charged/discharged liquid battery of Comparative Example 2.

As shown in FIG. 4, it was proved that the desired battery capacity was not obtained by the liquid battery of Comparative Example 2, in which the YbSi$_2$ was used as the anode active material.

Meanwhile, as shown in FIG. 3, it was proved that the desired battery capacity was obtained by the all-solid-state battery of Example 1, in which the YbSi$_2$ was used as the anode active material.

The reason for the poor battery capacity of Comparative Example 2 is inferred as follows. In the liquid battery of Comparative Example 2, the YbSi$_2$ reacted with the liquid electrolyte to form a coating film. Accordingly, it was difficult to form an interface between the liquid electrolyte and the anode active material, and the desired ion conductivity was not insured. As a result, the desired battery capacity was not obtained.

Meanwhile, the reason for the desired battery capacity of Example 1 is inferred as follows. In the all-solid-state battery of Example 1, the YbSi$_2$ was less reactive with the solid electrolyte. Accordingly, a coating film was less likely to be formed, and a good interface was formed between the solid electrolyte and the anode active material to ensure desired ion conductivity. As a result, the desired battery capacity was obtained.

REFERENCE SIGNS LIST

11. Solid electrolyte layer
12. Cathode layer
13. Anode layer
14. Cathode current collector
15. Anode current collector
16. Cathode
17. Anode
100. All-solid-state battery

The invention claimed is:
1. An all-solid-state battery comprising a cathode, an anode, and a solid electrolyte layer disposed between the cathode and the anode,
   wherein the anode comprises an anode layer,
   wherein the anode layer contains $YbSi_2$ as an anode active material, a solid electrolyte, an electroconductive material and a binder, and
   wherein the $YbSi_2$ is contained in an amount of 50 mass % or more and 90 mass % or less of the total mass of the anode layer.

* * * * *